United States Patent
Yamawaki et al.

[11] 3,755,284
[45] Aug. 28, 1973

[54] PROCESS FOR POLYMERIZATION OF CONJUGATED DIENE

[75] Inventors: Takeshi Yamawaki; Tetsumi Suzuki; Seiichi Hino, all of Tokyo, Japan

[73] Assignee: Mitsubishi Chemical Industries, Ltd., Tokyo, Japan

[22] Filed: Aug. 3, 1971

[21] Appl. No.: 168,767

[30] Foreign Application Priority Data
Aug. 20, 1970 Japan.................................. 45/73088

[52] U.S. Cl................ 260/94.3, 260/82.1, 260/84.1, 252/429 B
[51] Int. Cl......... C08d 3/04, C08d 3/08, C08d 3/12
[58] Field of Search.................. 260/94.3, 84.1, 82.1; 252/429 B

[56] References Cited
UNITED STATES PATENTS
3,577,396   5/1971   Throckmorton................... 260/82.1
3,624,000   5/1971   Throckmorton................ 260/94.3 X
3,674,759   7/1972   Yamawaki et al................. 260/82.1

Primary Examiner—Joseph L. Schofer
Assistant Examiner—William Hamrock
Attorney—Norman F. Oblon et al.

[57] ABSTRACT

A conjugated diene is polymerized in the presence of a two-component catalyst wherein the first component has the general formula:

$$M_1(M'F_n)_m \cdot xL$$

wherein M represents Co, Ni or Fe; M' represents an element of Groups III–V of Series 3–7 of Mendeleeff's Periodic Table; and L represents a ligand having an active hydrogen atom; $1$ and $m$ are respectively integers of from 1–3; $n$ is an integer of from 5–6; $x$ is an integer of from 0–6; and the valence of M multiplied by $1$ equals the valence of $M'F_n$ multiplied by $m$; and the second component is an organometallic compound of a Group II–III metal of Mendeleeff's Periodic Table.

11 Claims, No Drawings

PROCESS FOR POLYMERIZATION OF CONJUGATED DIENE

BACKGROUND OF THE INVENTION

1. Field Of The Invention

This invention relates to a process for polymerizing a conjugated diene, and more particularly to an improved process for polymerizing a conjugated diene using a novel catalyst, which is effective for industrial scale production.

2. Description Of Prior Art

Polymers of conjugated dienes having a high cis-1,4 structure (hereinafter referred to as high cis-content rubber) have exceptionally good mechanical properties, particularly high negative elasticity, good weather durability, good abrasion resistance and low dynamic exothermic properties as compared with SBR rubber, prepared by copolymerizing styrene and 1,3-butadiene. Accordingly, these types of polymers are particularly well suited as a rubber replacement in the preparation of tires. A wide variety of different catalysts are known for preparing high cis-rubbers. However, none of those disclosed in the prior art have been found to be completely satisfactory. Some are difficult to prepare and some only increase the cis-content of the conjugated structure of conjugated diene polymers with great difficulty. A need continues to exist, therefore, for a catalyst which is more satisfactory for producing such high cis-polymers.

SUMMARY OF THE INVENTION

Accordingly, it is one object of this invention to provide a process for preparing a polymer of a conjugated diene, having a high cis-content, with a more effective catalyst than has heretofore been available.

It is another object of this invention to provide a catalyst system which can be used for preparing polymers of conjugated dienes to provide a high cis-content.

These and other objects have now been attained by using a two-component catalyst, wherein the first component is an organic complex of Ni, Co or Fe and the second component is an organometallic compound of a Group II or III metal of Mendeleeff's Periodic Table.

More particularly, the first catalyst component has the general formula:

wherein M represents Co, Ni or Fe; M' represents an element of Group III–V of Series 3–7 of Mendeleeff's Periodic Table; and L represents a ligand having at least one active hydrogen atom; $l$ and $m$ are respectively integers of from 1–3; $n$ is an integer of from 5–6; $x$ is an integer of from 0–6; and the second catalyst component is an organometallic compound of a Group II–III metal of Mendeleeff's Periodic Table.

DETAILED DESCRIPTION OF THE PREFERRED EMBODIMENTS

The first catalyst component has the general formula:

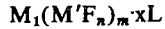

and is a compound containing Ni, Co or Fe as the cationic component M. Especially preferred are Co and Ni. Anionic components of $M'F_n$ of said compounds include the fluorine compounds of the elements of Groups III–V of Series 3–7 of Mendeleeff's Periodic Table, such as Si, Ti, Zr, P, Ge, Sn, As, Sb, Bi, V, Ga, In, Se, Y, Nb, etc. Especially preferred are the fluorine compounds of the elements of Group IV, e g., Si, Ti, and Zr. The valence of cationic component M multiplied by $l$ equals the valence of anionic component $M'F_n$ multiplied by $m$.

The ligand L can be hydrogen oxide, alcohol, phenol, carboxylic acid, amine, amide, or nitrile, carboxylic acid ester, ketone bonding as active hydrogen atom to a carbon atom thereof. Suitable ligands include, methyl alcohol, ethyl alcohol, propyl alcohol, isopropyl alcohol, butyl alcohol, isobutyl alcohol, amyl alcohol, aryl alcohol, cyclohexenyl, cyclohexenyl alcohol, methylcyclohexanol, chloropropyl alcohol, phenol, cresol, chlorophenol, formic acid, propionic acid, acrylic acid, isobutyric acid, butylic acid, lauric acid, cyclohexanecarboxylic acid, methylcyclohexanecarboxylic acid, benzoic acid, trichloroacetic acid, dichloroacetic acid, monochloroacetic acid, trifluoroacetic acid, chlorobenzoic acid, methylamine, ethylamine, diethylamine, triethylamine, ethanolamine, pyridine, aniline, acetoamide, urea, acetoan ilide, propionanilide, diethyl malonate, malonic acid dinitrile and acetylacetone. It is especially preferred that the ligand L be an organic ligand, especially an alcohol or a carboxylic acid, because of their high activity.

Preferred first catalyst components are the 6-hydrate complexes, such as 6-ethylalcohol complex of nickel silicofluoride, 6-butyl alcohol complex of nickel titanium fluoride, 6-ethyl alcohol complex of nickel zirconium fluoride, 6-ethyl alcohol complex of cobalt titanium fluoride, 6-acetic acid complex of ferric phosphofluoride, and 6-isobutanol complex of nickel aluminum fluoride.

It is possible to obtain a hydrocarbon soluble complex by appropriate selection of the ligand L to enable easy processing to increase the activity of the component and to decrease the quantity of component required.

The first catalyst component can be prepared by reacting a fluorine-containing acid with a basic salt of metal of Group VIII of the Periodic Table. The 6-hydrate complex (ligand xL of said general formula is 6-H₂O) such as nickel silicofluoride · 6 hydrate, nickel titanium fluoride · 6-hydrate, can be obtained by reacting a fluorine-containing acid, such as hydrosilicofluoric acid, hydrotitaniumfluoric acid, with a basic salt, such as nickel hydroxide, and then the resulting product is condensed and dried. Moreover, lower hydrates of said complex can be obtained by thermal decomposition of the 6-hydrate.

The first catalyst component can be prepared by reacting the hydrate complex with an orthoformic acid ester, an acetal, a ketal, a carboxylic anhydride, an alcohol, a phenol, a carboxylic acid, an amine, an amide, or a nitrile, a carboxylic acid ester, or a ketone having an active hydrogen atom bonded to a carbon atom (hereinafter referred to as the "ligand agent"). Suitable ligand agents include the orthoformic acid esters, such as methyl, ethyl, propyl, isobutyl, neopentyl, amyl, aryl, cyclohexyl, cyclohexenyl, methylcyclohexyl, chloropropyl, phenyl, toluyl, and chlorophenyl esters; the acetals, such as acetoaldehydodimethylacetal, acetoaldehydodiethylacetal, etc.; the ketals, such as acetondimethylacetal, acetodiethylacetal, etc.; the alcohols, such as methyl alcohol, ethyl alcohol, propyl alcohol, isopropyl alcohol, butyl alcohol, isobutyl alcohol, neopentyl alcohol, amyl alcohol, aryl alcohol, cyclohexanol, cyclohexenyl alcohol, methylcyclohexanol, chloropropyl alcohol, etc.; the phenols, such as phenol, cresol, chlorophenol, etc.; the carboxylic acids, such as formic acid, acetic acid, propionic acid, acrylic acid, isobutyric acid, butyric acid, lauric acid, cyclohexane carboxylic acid, methylcyclohexanecarboxylic acid, benzoic acid, trichloroacetic acid, dichloroacetic acid, monochloroacetic acid, trifluoroacetic acid, chlorobenzoic acid, etc.; the carboxylic anhydrides, such as the anhydride of any of said carboxylic acids; the amines, such as methylamine, ethylamine, diethylamine, triethylamine, ethanolamine, pyridine, aniline, etc.; the amides, such as acetoamide, urea, acetoanilide, propionanilide, etc.; and the nitriles, carboxylic acid esters and ketones having an active hydrogen atom bonded to a carbon atom such as acetylacetone, ethyl malonate, ethyl acetoacetate, malonic dinitrile, etc.

By reacting one of the above ligand agents with a hydrate, the corresponding complexes can be obtained. For example, when an orthoformic ester, acetal, or ketal, as the ligand agent, is reacted with the hydrate, the corresponding alcohol complex, or phenol complex, can be obtained.

When carboxylic anhydride is the ligand agent, the corresponding carboxylic acid complex can be obtained. Stoichiometric amounts of the ligand agent may be used for this reaction. However, it is preferable to use an excess amount in order to provide a more smooth reaction. The temperature of the reaction may be from 0°– 150°C., and preferably from 20° – 100°C. When an orthoformic ester, acetal, ketal or carboxylic anhydride is used as the ligand agent, the alcohol, phenol, or carboxylic acid may be used as the reaction solvent.

Generally, it is preferable to conduct the reaction under dehydration conditions, such as (1) by removing water from the reaction system by azeotropic distillation after addition of an azeotropic compound, or (2) by selectively removing water from the reaction system by use of a molecular sieve. In the azeotropic distillation technique (1), the compounds added to the reaction system can be any of those having lower boiling points compared with that of the ligand agent, which can be azeotropically distilled with water and which are inert to the reactants. For instance, suitable azeotropic compounds include the aromatic compounds, such as benzene, toluene; the aliphatic compounds, such as pentane, hexane; the cycloaliphatic compounds, such as cyclohexane or methylcyclohexane; and the oxygen containing compounds, such as ether; or mixtures thereof. Where the azeotropic temperature is high, it is preferable to effect reaction in a vacuum to prevent decomposition of the complex. Following the reaction, any unreacted material and solvent are removed to yield the first catalyst component.

The second catalyst component used in the process of this invention is an organometallic compound of a Group II–III metal of the Periodic Table. Suitable organometallic compounds are those of the metals Al, Zr, Mg, Cd, such as dialkylmagnesium, alkylmagnesiumhalide, trialkylaluminum, dialkylaluminumhalide, alkylaluminumsequihalide, alkylaluminumdihalide, dialkylzinc, etc. The alkyl radical in said compounds may have been one – 20 carbon atoms. However, all or part of the alkyl radicals may be substituted with a cycloalkyl radical, an aryl radical, or a portion of any of said radicals may be substituted with hydrogen. The organometallic compound may also contain a halogen, such as chlorine, bromine or iodine. Suitable organometallic compounds include triethylaluminum, triisobutylaluminum, trihexylaluminum, trioctylaluminum, tridecylaluminum, triisopropylaluminum, diethylaluminum chloride, ethylaluminumsesquichloride, monoethylaluminumdichloride, diethylzinc, etc. Most preferable for best results are the trialkylaluminums, such as triethylaluminum, triisobutylaluminum, trihexylaluminum.

Mixtures of organometallic compounds can also be used, such as mixtures of triethylaluminum and diethylaluminum chloride; or mixtures of diethylaluminum chloride and monoethylaluminum dichloride. Also, Group II–III metal hydrides or Group II–III metal chlorides can be admixed with the Group II–III organometallic compound.

In preparing the catalyst for use, both of said first and second catalyst components are mixed in a suitable solvent, such as any of those solvents which will hereinafter be described as a reaction solvent. It is possible, however, to prepare and use the catalyst in a nonsolvent mixture.

The manner of mixing the two catalyst components is not critical and either may be added to the other. For instance, the first catalyst component may be dissolved in the solvent, and the second catalyst component added to it. Alternatively, the second catalyst component may be dissolved in the solvent and the first catalyst component is added to it. The preparation of catalyst is usually conducted in an atmosphere of inert gas such as nitrogen or argon gas. The catalyst should be prepared, however, in an inert atmosphere such as an atmosphere of nitrogen or argon.

The ratio of second catalyst component to first catalyst component may be widely selected from a molar ratio of 0. 1 – 2,000 and preferably a molar ratio of 0.2 – 1,000. The catalyst prepared by said method can be used for the polymerization of a conjugated diene without aging, either with or without being diluted with a solvent. If the catalyst is diluted with a solvent, any insoluble material present with the catalyst may be removed by simple filteration, etc., and the tenate may be used as the catalyst. It is possible, of course, to use the catalyst solution without separating insoluble material.

The conjugated dienes which may be polymerized using the present catalyst include 1,3-butadiene, methyl-substituted butadiene-1,3, i.e., isoprene;and piperylene;conjugated aliphatic diolefins having more than 5 carbon atoms, such as 2,3-dimethyl-butadiene 1,3,2-ethyl-butadiene-1,3,hexadiene-2,4; or conjugated alicyclic diolefin hydrocarbons, such as cyclopentadiene, cyclohexadiene-1,3. It is possible to use a mixture of two, three or more of the conjugated dienes, or to use a mixture of conjugated diene with another unsaturated comonomer, such as styrene.

Polymerization is conducted in the presence of the catalyst with or without an inert solvent. Suitable solvents include the aromatic hydrocarbons, e.g., benzene, toluene, xylene; the aliphatic hydrocarbons, e.g., n-hexane, n-pentane; alicyclic hydrocarbons, e.c., cyclohexane, methylcyclohexane;hydrocarbon mixtures, e.g., petroleum ether, or ligroin. Reaction can be effected at atmospheric pressure or higher pressures. The reaction can be conducted at any temperature in which the solvent remains liquid. Good results are obtainable with reaction temperatures of from −20°C. − 100°C., preferably 0°–60°C. Since the catalyst of this invention is remarkably active in even small amounts, the molar ratio of the first catalyst component to the conjugated diene may be as low as $10^{-6} - 1$, and preferably $10^{-5} - 10^{-1}$.

A molecular weight regulator may be used in the polymerization reaction, such as water, vinylcycloolefin or an organo-fluoro compound. When water is used as the molecular weight regulator, small amounts of between 0.1 – 2 mole per mole of the second catalyst component are effective, and may be added to the reaction system either during the preparation of the catalyst, prior to initiation of polymerization or during the initial stages of polymerization.

When an organic-fluoro compound is used as the regulator, suitable compounds, include fluorine-containing carboxylic acids, such as trifluoroacetic acid, difluoroacetic acid, fluoroacetic acid, 2,2,2-trifluoropropionic acid, 3,3,3-trifluoropropionic acid, phenyldifluoroacetic acid; fluorine containing carboxylic anhydrides;fluorine containing alcohols, such as 2,2,2-trifluoroethanol, 2,2-difluoroethanol, 3,3,3-trifluoropropanol, 3,3,3-trifluoro-2-phenyl-ethanol;fluorine-containing ketones, such as 1,1,1-trifluoro-2,4-pentandione, 1,1,1-trifluoroacetone;fluorine containing ethers, such as fluoromethylether;carboxylic acid fluorides, such as acetyl fluoride, propyonyl fluoride; fluorine containing aldehydes, such as trifluoroacetoaldehyde;difluoroacetoaldehyde, fluoroacetoaldehyde, phenyldifluoroacetoaldehyde;fluorine containing esters, such as methyl trifluoroacetate, ethyl trifluoroacetate, 2,2,2-trifluoroethyl acetate. The quantity of organic fluorine containing compound depends upon reaction conditions, such as the amount and type of catalyst, the type of solvent, the concentration of monomer. Good results are obtainable when it is used in amounts of from 0.01 – 100 mole , preferably 0.1 – 10 mole per mole of first catalyst component. The organic fluorine containing compound can preferably be added prior to polymerization or at the initial period of polymerization.

Suitable vinylcycloolefins useful as molecular weight regulators include 1-vinyl-cyclohexene-3,1,3-dimethyl-1-vinyl cyclohexene-3, 1-vinylcyclopentene-3, 1-vinylcyclobutene-2,limonene and 3,5-diethyl-1-vinylcyclopentene-2, etc. Especially preferred is 1-vinylcyclohexene-3, because it can be easily obtained as a Diels-Alder reaction product with butadiene, and does not adversely affect the mechanical properties of the resulting polymer. The amount of vinylcycloolefin used can be selected within the range of 0 – 20 percent by weight based on the weight of conjugated diene, and depending upon the desired molecular weight of the polymer. Best results are obtained when the vinylcycloolefin is used in amounts of 0.001 – 10 percent by weight based on the weight of conjugated diene. The vinylcycloolefin is preferably added prior to polymerization or at initial stages of polymerization.

The conjugated diene polymer prepared by the above-described polymerization reaction can be treated conventionally, for example, the polymer may be recovered by distillation of the solvent, or by precipitation by the addition of an alcohol, ketone, etc.

As stated above, the catalyst component used for this invention can be easily prepared and can be used without aging and is active even at relatively low temperatures.

When 1,3-butadiene is used, a high cis-polybutadiene having good shape forming, low gel content, can be effectively prepared on an industrially acceptable scale.

Having generally described the invention, a further understanding can be obtained by reference to certain Examples which are provided herein for purposes of illustration only and are not intended to be limiting in any manner.

(EXAMPLES 1–4)

6.2 g. of the 6-hydrate complex of nickel silicofluoride ($NiSiF_6 \cdot 6H_2O$), 21 cc. of ethyl orthoformate and 100 cc. of ethyl alcohol were charged into a flask, and were refluxed for 10 hours to cause a color change from green to pale yellow. The reacted solution was concentrated in a vacuum to remove ethyl alcohol and unreacted ethyl formate. The resulting concentrated solution was washed with moisture-free toluene and was dried in vacuo to yield 9.5 g. of a yellowish-green powder.

It was confirmed that the resulting product was an ethyl alcohol complex of nickel silicofluoride ($NiSF_6 \cdot 6C_2H_5OH$), since 6 moles of ethyl alcohol to 1 mole of nickel resulted when added to water. 0.10 m. mole of $NiSiF_6 \cdot 6C_2H_5OH$, 89 ml. of water-free toluene, 1.0 m. mole of 1,3-butadiene, were charged to a reactor, filled with argon, and the following amount of triethylaluminum was respectively added to the mixture to prepare a catalyst solution.

13 g. of purified 1,3-butadiene was added to the catalyst solution and was polymerized at 40°C. for 6 hours with stirring. After the reaction, the resulting mixture was poured into a large amount of methanol containing 2% of 3,5-di-t-butyl-4-hydroxytoluene (age resistor), thereby precipitating the polymer. The polymer was dried at 50°C. in vacuo and polymerization conversion, inherent viscosity in toluene at 30°C., and microstructure of polymer, were each measured. No gel formation was found. The fine structure of polymer was measured by MORERO method described in La Chimica e Industria 41 758–762 (1959).

| Example | Amount triethyl-aluminum (mmole) | Polymerization conversion (wt. percent) | Inherent viscosity 30° C. toluene (dl./g.) | Cis 1,4 content (percent) | Trans 1,4 content (percent) | Vinyl content (percent) |
|---|---|---|---|---|---|---|
| 1 | 0.1 | 23.3 | 3.8 | 98.7 | 0.4 | 0.9 |
| 2 | 0.2 | 48.3 | 3.6 | 98.6 | 0.1 | 1.3 |
| 3 | 0.3 | 54.5 | 3.7 | 98.6 | 0.1 | 1.3 |
| 4 | 0.4 | 33.3 | 3.7 | 98.5 | 0.1 | 1.4 |

(EXAMPLES 5 – 8)

6.6 g. of 6-hydrate complex of nickel titanium fluoride ($NiTiF_6 \cdot 6H_2O$), 22 cc. of ethyl orthoformate, and 100 cc. of ethyl alcohol were charged into a flask, and were refluxed for 5 hours to cause a color change from green to pale yellowish-green. The reacted solution was concentrated in vacuo to remove ethyl alcohol and unsaturated ethyl formate. The concentrated solution was washed with moisture-free toluene and was dried in vacuo to yield 9.9 g. of a yellowish-green powder of 6-ethyl alcohol complex of nickel titaniumfluoride (NiTiF$_6$· 6C$_2$H$_5$OH), 1,3-butadiene was polymerized in accordance with the process of Example 1, by replacing NiSiF$_6$· 6C$_2$H$_5$OH with NiTiF$_6$· 6C$_2$H$_5$OH. The resulting polymer had no gel component, and the results of analysis of the polymer are as follows:

| Example | Amount triethyl-aluminum (mmole) | Polymerization conversion (wt. percent) | Inherent viscosity 30° C. toluene (dl./g.) | Cis 1,4 content (percent) | Trans 1,4 content (percent) | Vinyl content (percent) |
|---|---|---|---|---|---|---|
| 5 | 0.1 | 39.0 | 3.9 | 99.5 | 0.1 | 0.4 |
| 6 | 0.2 | 55.8 | 3.7 | 99.0 | 0.1 | 0.9 |
| 7 | 0.3 | 59.6 | 3.6 | 98.7 | 0.1 | 1.2 |
| 8 | 0.4 | 46.4 | 2.9 | 97.3 | 0.1 | 2.5 |

(EXAMPLES 9 – 12)

Ethyl alcohol complex of nickel zircofluoride (NiZrF$_6$·6C$_2$H$_5$OH) was prepared in accordance with the process of Example 1 by using the 6-hydrate complex of nickel zircofluoride (NiZrF$_6$·6H$_2$O). 1,3-butadiene was polymerized in accordance with the process of Example 1 by replacing NiSiF$_6$·6C$_2$H$_5$OH with NiZrF$_6$·6C$_2$H$_5$OH. The resulting polymer had no gel component and the results of analysis of the polymer were as follows:

| Example | Amount triethyl-aluminum (mmole) | Polymerization conversion (wt. percent) | Inherent viscosity 30° C. toluene (dl./g.) | Cis 1,4 content (percent) | Trans 1,4 content (percent) | Vinyl content (percent) |
|---|---|---|---|---|---|---|
| 9 | 0.4 | 30.1 | 4.5 | 98.5 | 0.1 | 1.4 |
| 10 | 0.6 | 40.6 | 4.4 | 98.2 | 0.1 | 1.7 |
| 11 | 0.7 | 41.5 | 4.1 | 97.9 | 0.1 | 2.0 |
| 12 | 0.8 | 34.9 | 4.3 | 98.0 | 0.1 | 1.9 |

(EXAMPLES 13 – 15)

0.10 m. mole of 6-alcohol complex of nickel silicofluoride, 105 ml. of moisture-free toluene, 10 m mole of 1,3-butadiene and the following amount of triethylaluminum were charged into a reactor, filled with argon, and were aged at 40°C. for 2 hours to prepare a catalyst solution. 20 g. of purified 1,3-butadiene was added to said catalyst solution and was polymerized at 40°C. for 2 hours. The resulting product was then treated in accordance with the process of Example 1 to yield a high cis-polybutadiene having about a 99.5% cis-content.

| Example | Alcohol (ligand) | Ratio of catalyst components Al/Ni (molar ratio) | Polymerization conversion (wt. percent) | Gel content (wt. percent) | Cis content (wt. percent) | Viscosity ηsp./c. (dl./g.)[1] |
|---|---|---|---|---|---|---|
| 13 | Methanol | 3.0 | 28 | 5.8 | 99.5 | 5.6 |
| 14 | n-Propanol | 6.0 | 21 | 0.3 | 99.5 | 8.6 |
| 15 | i-Butanol | 2.6 | 72 | 0.5 | 99.5 | 9.6 |

[1] C.=0.5 g./dl. in toluene at 30° C.

(EXAMPLES 16 – 17)

0.1 m mole of 6-isobutyl alcohol complex of nickel silicofluoride, 105 ml. of moisture-free toluene and 10 m mole of 1,3-butadiene and the following amounts of triisobutylaluminum were charged into a reactor filled with argon, and were aged at 40°C. for 2 hours, to prepare a catalyst solution. 20 g. of purified 1,3-butadiene were added to said catalyst solution and was polymerized at 40°C. for 2 hours.

| Example | Ratio of catalyst components Al/Ni (molar ratio) | Polymerization conversion (wt. percent) | Mooney viscosity ML at 100 1+4 | Gel content | Cis content | Viscosity ηsp./c. (dl./g.)[1] |
|---|---|---|---|---|---|---|
| 16 | 2.0 | 88 | 91.0 | 1.0 | 99.5 | 8.0 |
| 17 | 3.0 | 90 | 70.0 | 1.0 | 99.5 | 8.0 |

[1] C.=0.5 g./dl. toluene.

(EXAMPLE 18)

6-isobutyl alcohol complex of nickel silicofluoride (NiSiF$_6$· 6 i-C$_4$H$_9$OH) was prepared in accordance with the process of Example 1 by reacting NiSiF$_6$· 6H$_2$O with isobutyl orthoformate. 0.22 m mole of NiSiF$_6$·6 i-C$_4$H$_9$OH and the following amounts of trifluoroacetic acid (CF$_3$COOH), 15 m mole of 1,3-butadiene in toluene, and 0.375 m mole of triethylaluminum were admixed therewith to prepare a catalyst solution. 1,3-butadiene was polymerized in the presence of said catalyst solution, at 40°C. for 4 hours to yield a high cis-polybutadiene having a 99% cis-content and the following molecular weight.

| | Amount trifluoroacetic acid (molar ratio to Ni) | 1,3-butadiene (mole) | Polymerization conversion (percent) | Mooney viscosity at 100 ML 1+4 | Viscosity η sp./c. (dl./g.)[1] |
|---|---|---|---|---|---|
| i | 0 | 0.885 | 85 | 68.0 | 7.0 |
| ii | 0.3 | 0.896 | 87 | 54.0 | 6.1 |
| iii | 0.6 | 0.895 | 89 | 44.0 | 5.1 |
| iv | 0.8 | 0.890 | 91 | 37.0 | 4.7 |
| v | 1.0 | 0.895 | 88 | 27.0 | 3.9 |

[1] (C.=0.5 g./dl. toluene to 30° C.)

(EXAMPLE 19)

0.22 m mole of isobutyl alcohol complex of nickel silico-fluoride obtained in Example 18 (NiSiF$_6$· 6 i-C$_4$H$_9$OH), 15 m mole of 1,3-butadiene in toluene and 0.45 m mole of triisobutylaluminum were mixed to prepare a catalyst solution. A mixture of vinylcyclohexene and 1,3-butadiene was polymerized by using said catalyst solution at 40°C. for 3 hours to yield a high cis-polybutadiene having a 99% cis-content.

| | Vinylcyclohexene (molar ratio to Ni) | 1,3-butadiene (mole) | Polymerization conversion (percent) | Mooney viscosity at 100 ML 1+4 | Viscosity η sp./c. (dl./g.) [1] |
|---|---|---|---|---|---|
| i | 0 | 0.885 | 85 | 65.5 | 7.1 |
| ii | 10 | 0.895 | 82 | 47.0 | 5.4 |
| iii | 20 | 0.890 | 78 | 37.0 | 4.5 |
| iv | 40 | 0.885 | 72 | 24.0 | 3.7 |
| v | 60 | 0.896 | 67 | | 3.1 |

[1] C.=0.5 g./dl.

(EXAMPLE 20)

100 ml. toluene solution of 0.026 mole/liter isobutyl alcohol complex of nickel silicofluoride prepared in Example 18, (NiSiF$_6$· 6 i-C$_4$H$_9$OH), 100 ml. toluene solution of 1 mole/liter 1,3-butadiene, 3.6 ml. toluene solution of 1 mole/liter of triethylaluminum and 1.4 m mole of trifluoroacetic acid were mixed at 40°C. and stirred for 1 hour to prepare a catalyst solution. 4,320 ml. of toluene, 12.2 moles of butadiene, 50 m moles of vinylcyclohexene and said catalyst solution were charged and polymerized at 40°C. for 5 hours. The resulting product was treated by conventional processes to yield a high cis-polybutadiene having a 99.5% cis-content. The cis-polybutadiene has no gel component and has a Mooney viscosity 100°C. of 44.5 and an inherent viscosity $[\eta]^{ML\ 1+4}$ in toluene at 30°C. of 2.4.

(EXAMPLE 21)

0.125 m mole of isobutyl alcohol complex of nickel silicofluoride (NiSiF$_6$· 6 i-C$_4$H$_9$OH), 6.25 m moles of 1,3-butadiene, 100 ml. of toluene and the following amount of triethylaluminum were charged into a reactor and were reacted at 40°C. for 1 hour to prepare a catalyst solution.

17 g. of 1,3-butadiene, containing the following amounts of water was added to the catalyst solution and was polymerized at 40°C. for 3 hours. The resulting product was treated in accordance with Example 1, to yield a high cis-polybutadiene having a 99% cis-content.

| | Catalyst Al/Ni (molar ratio) | H$_2$O content H$_2$O/Al (molar ratio) | Polymerization conversion (percent) | Viscosity η sp./c. (dl./g.) [1] |
|---|---|---|---|---|
| i | 1.44 | 0.22 | 69.0 | 4.6 |
| ii | 1.44 | 1.1 | 78.5 | 3.0 |
| iii | 1.44 | 2.2 | 78.8 | 2.5 |
| iv | 2.88 | 2.2 | 70.0 | 2.8 |

[1] C.=0.5 g./dl. toluene.

(EXAMPLES 22 – 23)

30 m moles of 6-hydrate of nickel silicofluoride (NiSiF$_6$· 6H$_2$O) was dispersed in a hydrocarbon solvent containing 30 – 40 cc. of acetic anhydride or fluoroacetic anhydride, and was stirred for 1 hour at room temperature. Acetic acid complex of nickel silicofluoride (NiSiF$_6$·6CH$_3$COOH) or trifluoroacetic acid complex of nickel silicofluoride (NiSiF$_6$· 6 CF$_3$· COOH) was obtained, respectively. 0.1 m mole of said catalyst, 100 ml. of toluene, 10 m moles of 1,3-butadiene and the following amounts of triisobutylaluminum were charged into a reactor and held for 24 hours. 0.4 mole of 1,3-butadiene was charged and polymerized at 40°C. for 5 hours.

| Example | Catalyst | Triisobutyl aluminum (mmole) | Polymerization conversion (percent) | Viscosity η sp./c. (dl./g.) [1] | Cis content (percent) |
|---|---|---|---|---|---|
| 22 | NiSiF$_6$·6CH$_3$COOH | 0.3 | 56 | 4.2 | 98.2 |
| 23 | NiSiF$_6$·6CH$_3$COOH | 0.5 | 78 | 0.8 | 99.1 |

[1] C.=0.5 g./dl. toluene 30° C.

(EXAMPLES 24 – 31)

The process for polymerization of Example 22 was respectively repeated except using the following catalysts. The results are as follows:

| Example | First catalyst component (0.1 mmole) | Second catalyst component | Polymerization conversion (percent) | Viscosity η sp./c. (dl./g.) [1] | Cis-content (percent) |
|---|---|---|---|---|---|
| 24 | NiGaF$_5$·6(i-C$_4$H$_9$OH) | Al(i-C$_4$H$_9$)$_3$ 0.3 | 15 | 2.6 | 94.3 |
| 25 | NiSnF$_6$·6(i-C$_4$H$_9$OH) | Same as above | 19 | 1.5 | 95.6 |
| 26 | Ni(SbF$_6$)$_2$·6(i-C$_4$H$_9$OH) | do | 38 | 2.2 | 97.1 |
| 27 | CoInF$_5$·6(i-C$_4$H$_9$OH) | do | 12 | 3.1 | 89.6 |
| 28 | CoVF$_5$·6(i-C$_4$H$_9$OH) | do | 45 | 3.8 | 82.5 |
| 29 | CoTaF$_5$·6(i-C$_4$H$_9$OH) | do | 5 | 1.1 | 90.3 |
| 30 | NiSiF$_6$·6(i-C$_4$H$_9$OH) | Zn(C$_2$H$_5$)$_2$ 0.5 | 48 | 2.9 | 97.9 |
| 31 | CoSiF$_6$·6(i-C$_4$H$_9$OH) | AlC$_2$H$_5$Cl$_2$ 5.0 | 81 | | 98.6 |

[1] C.=0.5 g./dl. toluene 30° C.

(EXAMPLES 32 – 33)

The process for polymerization of example 22 was respectively repeated except using the following catalysts and adding water to the preparation of catalysts. The results are as follows:

| Example | First catalyst component | Second catalyst component Al(C$_2$H$_5$)$_2$Cl (mmole) | H$_2$O (mmole) | Polymerization conversion (percent) | Viscosity η sp./c. (dl./g.) [1] | Cis-content (percent) |
|---|---|---|---|---|---|---|
| 32 | NiSiF$_6$·6iC$_4$H$_9$OH | 1.0 | 0.1 | 53 | 3.6 | 89.9 |
| 33 | CoSiF$_6$·6iC$_4$H$_9$OH | 5.0 | 0.5 | 85 | 8.1 | 99.3 |

[1] C.=0.5 g./dl. toluene 30° C.

Having now fully described the invention, it will be apparent to one of ordinary skill in the art that many changes and modifications may be made thereto without departing from the spirit or scope of the invention. Accordingly,

What is claimed as new and intended to be secured by Letters Patent of the United States is:

1. A process for polymerization of a conjugated diene which comprises polymerizing a conjugated diene in the presence of a two-component catalyst system in which said first component has the general formula:

$$M_l(M'F_n)_m \cdot xL$$

wherein M represents Co or Ni; M' represents Si, Ti or Zr; and L represents a ligand having an active hydrogen atom; l and m are respectively integers of from 1 – 3; n is an integer of from 5 – 6; x is an integer of from 0 – 6; and the valence of M multiplied by l equals the valence of $M'F_n$ multiplied by m; and wherein said second component is an organometallic compound of a metal from Groups II–III of Mendeleeff's Periodic Table.

2. The process for polymerization of a conjugated diene according to claim 1, wherein the polymerization reaction is conducted in the presence of an inert solvent at −20°C. −100°C.

3. The process for polymerization of a conjugated diene according to claim 1, wherein the polymerization reaction is conducted in the presence of a molecular weight regulator selected from the group consisting of water, vinylcycloolefin, and an organic-fluoro compound.

4. The process for polymerization of a conjugated diene according to claim 1, wherein the molar ratio of the first catalyst component to the conjugated diene is $10^{-6} - 1 : 1$ and the molar ratio of the second catalyst component to the first catalyst component is 0.01 – 2000:1.

5. The process for polymerization of a conjugated diene according to claim 1, wherein the molar ratio of the first component to the conjugated diene is $10^{-5} - 10^{-1}:1$ and the molar ratio of the second component to the first component is 0.2 – 1000:1.

6. The process for polymerization of a conjugated diene according to claim 1, wherein the first component is a complex of hydrogen oxide.

7. The process for polymerization of a conjugated diene according to claim 1, wherein the first catalyst component is selected from the group consisting of complexes of ligands of alcohols, phenols, carboxylic acids, amines, amides, and nitriles, carboxylic acid esters and ketones, having active hydrogen atom bonded to a carbon atom.

8. The process for polymerization of a conjugated diene, according to claim 1, wherein the first component is prepared by reacting a hydrogen oxide complex of the corresponding metal compound with an organic ligand selected from the group consisting of an alcohol, phenol, carboxylic acid, amine, amide, and nitrile, carboxylic acid ester and a ketone having an active hydrogen atom bonded to a carbon atom, and wherein the hydrogen oxide complex of the corresponding metal compound is prepared by reacting a fluorine-containing acid with a basic salt of Ni, Co.

9. The process for polymerization of a conjugated diene according to claim 1, wherein the second component is an organometallic compound of an alkyl radical of one-20 carbon atoms, a cycloalkyl radical of one-20 carbon atoms, an aryl radical or an aralkyl radical.

10. The process for polymerization of a conjugated diene according to claim 1, wherein first and second catalyst components are prepared by being mixed in the presence of a conjugated diene.

11. The process for polymerization of a conjugated diene according to claim 10, wherein said conjugated diene is 1,3-butadiene.

* * * * *